United States Patent
Schibsbye

(10) Patent No.: US 9,404,472 B2
(45) Date of Patent: Aug. 2, 2016

(54) METHOD OF MANUFACTURING A WIND TURBINE BLADE

(75) Inventor: Karsten Schibsbye, Fredericia (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 283 days.

(21) Appl. No.: 13/282,791

(22) Filed: Oct. 27, 2011

(65) Prior Publication Data

US 2012/0114781 A1     May 10, 2012

(30) Foreign Application Priority Data

Nov. 4, 2010 (EP) .................................... 10190002

(51) Int. Cl.
| | |
|---|---|
| *B28B 1/16* | (2006.01) |
| *B28B 7/38* | (2006.01) |
| *B29C 41/08* | (2006.01) |
| *F03D 1/06* | (2006.01) |
| *B29K 105/00* | (2006.01) |
| *B29C 37/00* | (2006.01) |

(52) U.S. Cl.
CPC .............. *F03D 1/065* (2013.01); *B29C 37/0028* (2013.01); *B29C 37/0032* (2013.01); *B29C 37/0067* (2013.01); *B29C 2037/0039* (2013.01); *B29K 2105/251* (2013.01); *Y02E 10/721* (2013.01); *Y02P 70/523* (2015.11)

(58) Field of Classification Search
CPC ................... B29C 37/0032; B29C 2037/0039; B29C 37/0028; B29C 37/0067; B29C 2037/0042; B29K 2105/251; Y02P 70/523; Y02E 10/721

USPC ......... 264/299, 309, 101, 102, 257, 258, 259, 264/261, 263, 338, 511, 553, 571, 446; 425/504, 388, 405.1, 96, 98; 427/133, 427/475

See application file for complete search history.

(56) References Cited

U.S. PATENT DOCUMENTS

| | | | | |
|---|---|---|---|---|
| 3,492,192 | A * | 1/1970 | Bullard ...................... | C08J 9/34 156/78 |
| 4,681,712 | A * | 7/1987 | Sakakibara et al. .......... | 264/440 |
| 4,715,805 | A * | 12/1987 | Nasu .............................. | 425/504 |
| 5,116,216 | A * | 5/1992 | Cochran ................. | B29C 70/44 156/286 |
| 5,518,385 | A * | 5/1996 | Graff ............................ | 425/127 |
| 5,605,440 | A * | 2/1997 | Bocoviz et al. ............... | 415/200 |
| 5,855,709 | A * | 1/1999 | Bocoviz et al. ................. | 156/84 |
| 6,153,144 | A * | 11/2000 | Byma ............................. | 264/511 |
| 6,221,304 | B1 * | 4/2001 | Harris et al. ................... | 264/511 |
| 6,309,587 | B1 * | 10/2001 | Gniatczyk ............... | B29C 33/38 249/114.1 |
| 6,319,438 | B1 * | 11/2001 | Smith ............... | B29C 45/14811 264/173.17 |
| 6,408,567 | B1 * | 6/2002 | Clark ........................... | 43/42.53 |
| 6,849,218 | B1 * | 2/2005 | De Winter et al. ............ | 264/240 |
| 7,029,267 | B2 * | 4/2006 | Caron ........................... | 425/389 |

(Continued)

FOREIGN PATENT DOCUMENTS

| | | |
|---|---|---|
| DE | 4215914 A1 | 11/1993 |
| DE | 10348262 A1 | 5/2005 |

(Continued)

*Primary Examiner* — Seyed Masoud Malekzadeh

(57) ABSTRACT

A method to manufacture a blade, especially to manufacture a blade of a wind turbine is provided. An arrangement including a mold is provided and used to carry layers of blade-components. A dry-powder is applied at least to an inner surface of the mold, before the layers are arranged onto the inner surface of the mold. Thus the mold includes a dry powder-coat as a bottom layer.

4 Claims, 1 Drawing Sheet

(56) References Cited

U.S. PATENT DOCUMENTS

| | | | |
|---|---|---|---|
| 7,972,129 B2* | 7/2011 | O'Donoghue | 425/388 |
| 7,980,840 B2* | 7/2011 | Burchardt et al. | 425/129.1 |
| 8,202,454 B2* | 6/2012 | Burchardt et al. | 264/102 |
| 8,221,666 B2* | 7/2012 | Mikkelsen et al. | 264/257 |
| 8,240,992 B2* | 8/2012 | Liebmann | 416/20 R |
| 8,328,976 B2* | 12/2012 | Ren et al. | 156/285 |
| 8,337,740 B2* | 12/2012 | Rodman | 264/314 |
| 8,563,078 B2* | 10/2013 | Chairat et al. | 427/133 |
| 8,673,106 B1* | 3/2014 | Jolley | B29C 43/18 156/285 |
| 2003/0141721 A1* | 7/2003 | Bartlett | F03D 1/0675 290/55 |
| 2003/0170460 A1* | 9/2003 | Sienkiewicz | B29C 45/14811 428/411.1 |
| 2003/0180498 A1* | 9/2003 | De Winter et al. | 428/67 |
| 2005/0086916 A1* | 4/2005 | Caron | 55/382 |
| 2007/0205053 A1* | 9/2007 | Isham et al. | 182/207 |
| 2008/0237909 A1* | 10/2008 | Bech | 264/101 |
| 2008/0304971 A1* | 12/2008 | Liebmann | 416/20 R |
| 2009/0039566 A1* | 2/2009 | Rodman | 264/529 |
| 2010/0209651 A1* | 8/2010 | Mikkelsen et al. | 428/56 |
| 2011/0115131 A1* | 5/2011 | Chairat et al. | 264/446 |
| 2011/0151133 A1* | 6/2011 | Chairat et al. | 427/475 |
| 2012/0135219 A1* | 5/2012 | Graham | B29C 70/44 428/297.4 |
| 2012/0312469 A1* | 12/2012 | Stiesdal | 156/289 |
| 2013/0241117 A1* | 9/2013 | Lind et al. | 264/511 |

FOREIGN PATENT DOCUMENTS

| | | | | |
|---|---|---|---|---|
| FR | 2931087 | * | 5/2008 | B29C 37/00 |
| GB | 2115075 A | | 9/1983 | |
| JP | S6090076 A | | 5/1985 | |
| JP | H10286514 A | | 10/1998 | |
| PL | 182899 B1 | | 3/2002 | |
| WO | WO 2006066593 A1 | | 6/2006 | |

* cited by examiner

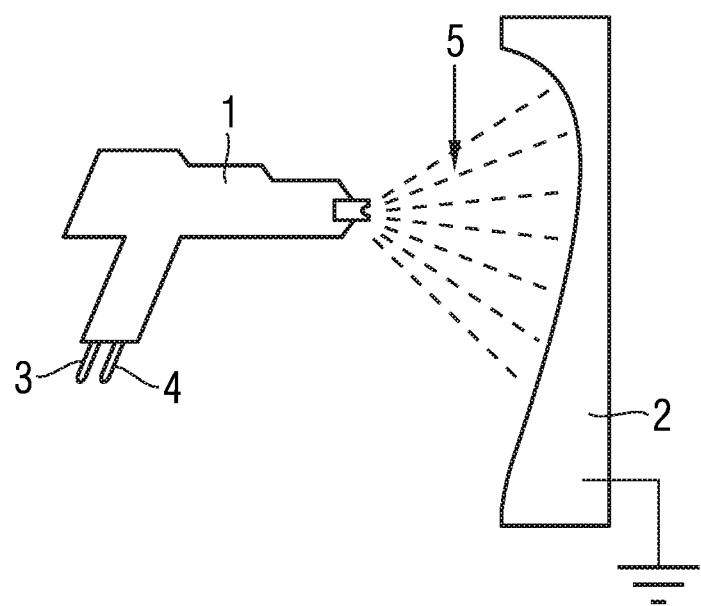

METHOD OF MANUFACTURING A WIND TURBINE BLADE

CROSS REFERENCE TO RELATED APPLICATIONS

This application claims priority of European Patent Office application No. 10190002.5 EP filed Nov. 4, 2010, which is incorporated by reference herein in its entirety.

FIELD OF INVENTION

The invention relates to a method to manufacture a blade, especially to manufacture a blade of a wind turbine.

BACKGROUND OF INVENTION

A blade, like a blade of a wind turbine, is exposed to numerous environmental influences like ultraviolet light, rain, ice, hail and abrasion, which is originated by microparticles in the wind passing by. Even the wind, which is acting on the blade, causes mechanic loads at the blade.

The blade, especially the surface of the blade, has to withstand the impacts—thus the surface of the blade is treated and processed accordingly.

It is known to use a painting at the surface to deal with the impacts addressed above.

Preferably a coating is brought towards the blade-surface by help of a spray gun. The spray gun can be part of an automated painting process or may even be used as hand-held in a manual handwork-process. A compressed gas like air is used to direct paint particles to the blade surface. As a result an even coating of liquid is originated at the blade-surface.

However this method shows the disadvantage that the whole painting procedure is time consuming and requires separate painting facilities with ventilation, heating, . . . etc. Thus the method is quite expensive in view to the costs.

It is also known to use a so called "gel-coat" to protect the surface of a blade, which is made of a composite material. The most common gel-coats comprise a "styrene-based" resin.

The gel-coat is liquid and is usually applied into a mould at a bottom layer. On top of the gel-coat additional layers of composite material, Balsa-wood, . . . , etc. are arranged in a sandwich-structure to build up the blade. All layers are cured together by resin, which is applied into the mould and to the layers.

As a result of this method the visible surface of the composite or blade shows a high-quality finish.

However the styrene-based gel-coat has a very bad odor and even comprises a health-risk for the personnel, who handle the gel-coat during the manufacturing of the blade. As a result additional steps for the personnel-protection are needed while even the costs are rising.

SUMMARY OF INVENTION

It is therefore the aim of the invention, to provide an improved method and arrangement to manufacture a blade, which is less expensive and less critical in view to the environment.

This aim is reached by the features of the claims and by the features of the claims.

Preferred configurations are object of the dependent claims.

According to the invention a blade is manufactured by help of a mould. A dry powder is applied like a coat to the inner surface of the mould.

The mould is arranged to be used later to build up the structure of the blade. Thus the mould carries different layers of blade-components, while the dry-powder-coat is the bottom layer of the blade-structure.

Next the components of the blade are arranged in layers on top of the dry-powder-coat and on top of the mould to build up the sandwich-structure of the blade. For example the blade may be manufactured by help of a "Vacuum Assisted Resin Transfer Moulding, VARTM"-process.

Finally resin might be applied to the mould and to the blade-components. When the resin cures out all sandwich-layers are connected.

The coat, which is originated or introduced by the dry powder, is established as blade-surface afterwards, for example after the blade-manufacturing-process.

Preferably the dry-powder is made of an amount of or even contains an amount of polymers like polyester, polyurethane, polyester-epoxy (which is also known as "hybrid"), straight epoxy (which is a so called "fusion bonded epoxy") and also acrylics. Even "styrene-based" dry-powder might be used.

The dry powder might be made of any material, which can serve as a blade-coating later to achieve a strong skin of the manufactured blade.

Preferably the material used allows an easy post-processing of the blade-skin if needed.

For example the material for the dry-powder might be chosen in a way that an optimized surface of the blade is generated for an additional painting.

The dry powder-coat is used as bottom layer within the mould.

As the powder is dry there is no additional need to protect the personnel working asides the mould—no harmful solvent needs to be used any more in view to the prior art cited above.

Preferably the dry powder is applied by the use of an electro-statically field to the inner surface of the mould.

Thus working-time is reduced and money is spared.

Preferably paint is employed or contained within the dry powder. The paint preferably contains powdered particles. The mixture of paint and powder is applied to the inner surface of the mould as described above to cover at least the inner surface of the mould.

Preferably an electrostatic field is used when the dry powder or mixture is applied to the mould. The electrostatic field is applied in a way that an even distribution of the powder/mixture asides at least the inner surface of the mould is achieved.

Preferably at least the inner surface of the mould is electrically connected with the "earth".

Due to the electrostatic field the powder/mixture is accelerated towards the mould. The whole method is quite clean as no powder or mixture is wasted.

Preferably surplus dry powder is gathered for a reuse within the method. Thus the method is quite economical in view to the material usage.

Preferably the powder/mixture is projected towards the mould by a spray-method.

Preferably an electrostatic gun or a corona gun is used for this purpose.

Preferably additional powder-coatings are applied stepwise to reach a pre-determined thickness. Thus a quite thick resulting coating is reached.

Preferably the dry powder/mixture is heated for its curing. Due to the heat the powder/mixture is liquefied, thus even complicated structures of the inner mould-surface can be covered by the fluid. When the fluid consolidates a hard surface of the manufactured blade is achieved. Thus a strong and well processable skin of the blade is gained.

Preferably the heat is applied to the mould.

Preferably the heat is applied before the resin is provided to the blade-structure (the resin may be provided by using the "Vacuum Assisted Resin Transfer Moulding, VARTM"-process).

It is even possible to use at least a part of the heat, which is released while the resin cures out.

BRIEF DESCRIPTION OF THE DRAWINGS

The invention is shown in more detail by help of FIG. 1.

DETAILED DESCRIPTION OF INVENTION

A mould 2, which is used to build up the structure of a blade, is electrical neutral coupled with the ground.

An electrostatic gun 1 is used to spray dry-powder 5 towards the mould 2.

The electrostatic gun 1 is connected with a line 3, which is used to provide at least the dry-powder to the gun 1.

Preferably (but not shown in detail here) paint is provided additionally as powdered particles to the dry-powder.

The electrostatic gun 1 is also connected with a line 4, which is used to produce an electrostatic field.

After the powder-applying-process layers of the blade-components (like composite material, glass fiber material, Balsa-wood, . . . , etc.) is laid up in the mould to get the three-dimensional structure of the blade. This might be done according to a "Vacuum Assisted Resin Transfer Moulding, VARTM"-process to get the blade-structure.

Preferably the mould and thus the applied dry-powder are heated. The powder is liquefied by the heat. Thus even complicated structures of the inner mould-surface are covered by the liquefied powder.

The liquefied powder consolidates and a hard surface for the blade is achieved.

Preferably the heat is applied to the mould before the resin is provided to the blade-structure. The resin may be provided by using the VARTM-process.

It is even possible to use at least a part of the heat, which is released due to the curing of the resin.

As a summary dry-powder is brought as a coating to the surface of a mould before other components (like composite material, glass fibers, etc.) is arranged onto the mould.

The powder-coat creates a hard finish, which is tougher than conventional painting.

The powder-coat emits no or nearly no volatile organic compounds, which in turn is environmentally safe.

A powder-coating-overspray can be recycled if the "wasted"-powder is gathered by appropriate means. Thus it is possible to achieve a nearly 100% usage of the coating powder-material.

A further advantage is that powder-coated-items have generally fewer appearance-differences between horizontally coated surfaces and vertically coated surfaces than liquid coated items.

The invention claimed is:

1. A method to manufacture a turbine blade, comprising:
   providing a mould which is used to carry a plurality of turbine blade-components;
   connecting an inner surface of the mould with an electrical ground;
   applying a mixture of dry polymeric powder and dry powdered paint particles directly to the inner surface of the mould before the plurality of turbine blade-components is arranged onto the inner surface of the mould, wherein the mould thus comprises a dry-powder-coat as a bottom layer;
   after the applying the mixture, arranging the plurality of turbine blade-components in layers on top of the dry-powder-coat bottom layer in order to build a sandwich-structure of the blade;
   after the arranging, applying heat to the mould in order to liquefy the mixture;
   after the applying heat, applying a Vacuum Assisted Resin Transfer Moulding (VARTM)-process, wherein resin is applied to the mould and the plurality of turbine blade-components in order to connect the sandwich-structure of the turbine blade when the resin cures; and
   curing the resin using an amount of heat to form the turbine blade with the connected sandwich-structure and a surface finish comprising resolidified polymeric and paint material, wherein the mixture is applied to the inner surface of the mould using an electrostatic-field for an even distribution of the mixture, and due to the electrostatic-field, the mixture is accelerated towards the mould, wherein the mixture is heated such that the mixture is liquefied and covers the inner surface of the mould.

2. The method according to claim 1, wherein additional coatings of dry polymeric powder or the mixture are applied stepwise to reach a predetermined thickness for a resulting coating.

3. The method of claim 1, wherein at least a portion of the heat for the curing is utilized to liquefy the dry polymeric powder and the dry paint powder.

4. The method of claim 1, wherein the dry polymeric powder comprises a member selected from the group consisting of polyester, polyurethane, polyester-epoxy, straight epoxy, and acrylic.

* * * * *